July 30, 1929.  C. G. CLEMENT  1,722,558
DROP FRAME TRAILER
Original Filed Feb. 12, 1923   2 Sheets-Sheet 1
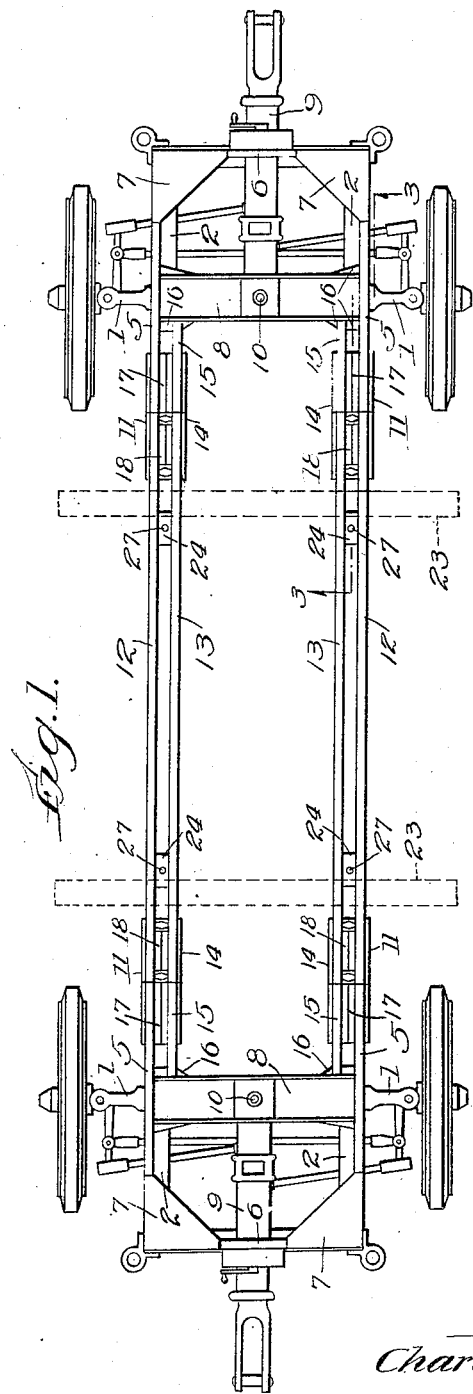
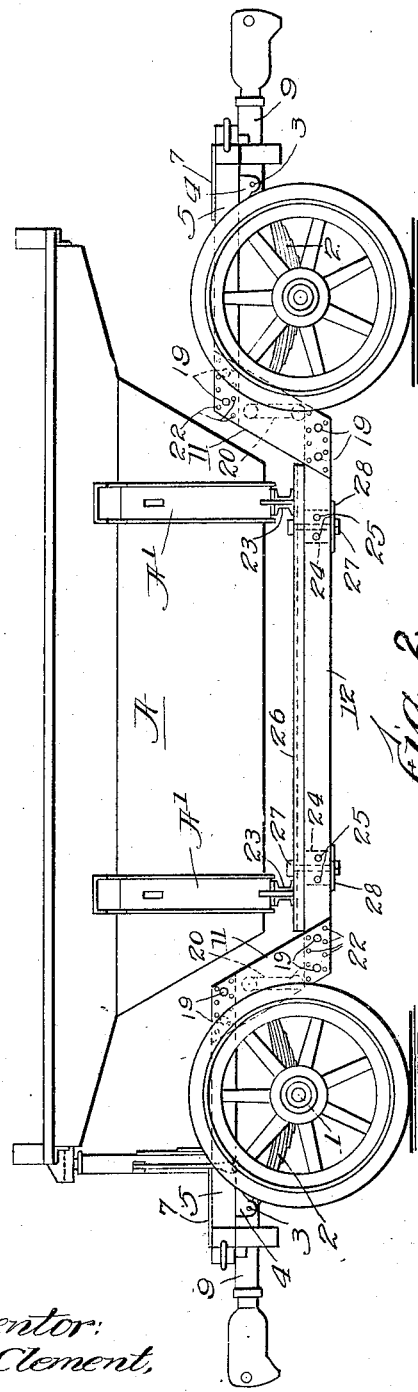
Inventor:
Charles G. Clement,
by Burton & Burton
his Attys.

July 30, 1929.   C. G. CLEMENT   1,722,558
DROP FRAME TRAILER
Original Filed Feb. 12, 1923   2 Sheets-Sheet 2
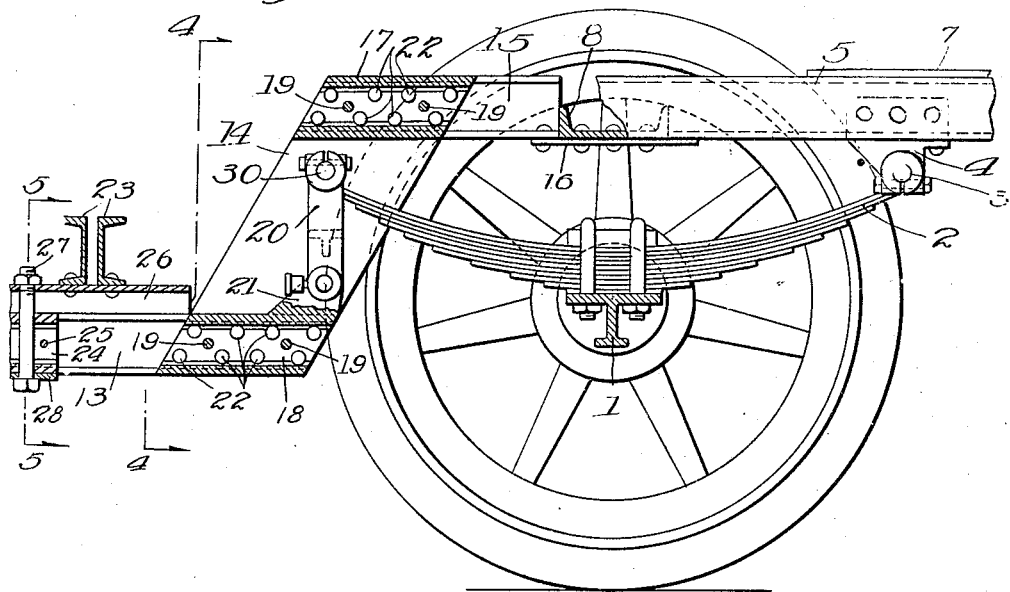
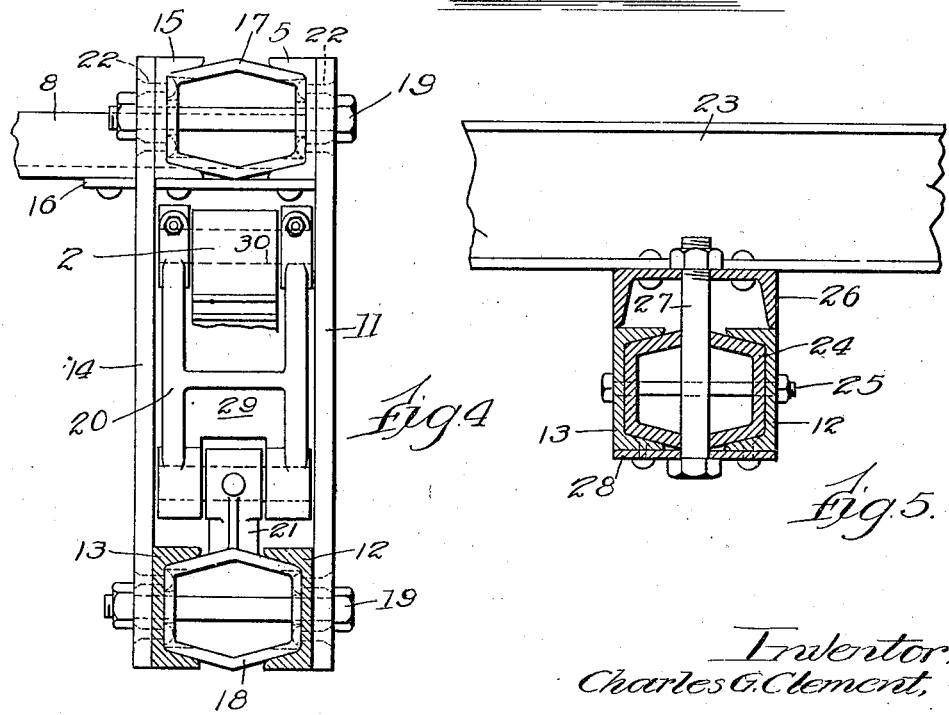
Inventor:
Charles G. Clement, Patented July 30, 1929.

1,722,558

UNITED STATES PATENT OFFICE.

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN.

DROP-FRAME TRAILER.

Application filed February 12, 1923, Serial No. 618,441. Renewed May 7, 1929.

This invention relates to a drop frame construction especially designed for a trailer vehicle and in which a considerable portion of the frame length extends in a plane below that of the axles. Its object is to provide a frame of this type which shall be amply strong without being unduly heavy or expensive to manufacture; the invention consists in various features and elements of construction contributing to this end as hereinafter described and shown in the drawings and as indicated by the claims.

In the drawings:

Figure 1 is a top plan view of a trainer frame or chassis embodying this invention.

Figure 2 is a side elevation of the same showing also a hopper body mounted on the frame.

Figure 3 is a detail section taken as indicated at line 3—3 on Figure 1.

Figure 4 is a detail section taken as indicated at line 4—4 on Figure 3.

Figure 5 is a detail section taken as indicated at line 5—5 on Figure 3.

In addition to the requirement that a considerable portion of the frame for this type of trailer shall be dropped or suspended below the plane of the axles it is necessary that this portion be located between the front and rear wheels so that a body of the general type shown at A in Figure 2 may be mounted to roll or tip laterally to either side for discharging its load. As illustrated, the frame is supported on the axles, 1, by means of four semi-elliptic springs, 2, each having one end shackled at 3 to a fixed bracket, 4, secured to the underside of the frame member, 5, near its end. The frame members, 5, are connected at their outer ends by cross-members, 6, reinforced with gusset plates, 7, at the corners. Directly over the axles, 1, said members, 5, are also tied together by transverse channel members, 8, to which the draw bars, 9 are pivoted at 10, as clearly seen in Figure 1. The inner end of each of the members, 5, carries a plate, 11, riveted thereto and trending obliquely downward for similar connection at its lower end with one of the longitudinal channel members, 12, of the drop frame.

Parts 5, 11 and 12 at each side of the vehicle thus define the shape of the drop frame but these parts are reinforced by channels, 13, (which are duplicates of the channels, 12,) plates, 14, similar to the plates, 11, and short channel members 15, extending parallel and opposite to the respective members, 5, but running only from the upper ends of the plates, 14, to the transverse channels, 8, where their ends are lodged upon the projecting edges of gusset plates, 16, which connect the members, 8, to the side frames, 5.

In constructing the frame the channels 5, and 12, are connected by plates, 11, as one assembly and the parts, 13 and 15, are riveted to the plates 14 as another assembly. Cast fillers, 17 and 18, are then interposed between the channels, 5 and 15, and the channels, 12 and 13, respectively and the assemblies are secured together with transverse bolts, 19, passing through the fillers. By this arrangement the plates, 11 and 14, are thus spaced apart and the inner end of each spring, 2, extends into the space between one pair of these plates. Instead of shackling this end of the spring to the upraised end portion of the frame composed of channels, 5 and 15, the dropped portion of the frame is directly suspended from the spring ends by links or hangers, 20, connecting with brackets, 21, which are formed integrally upon the spacing boxes, 18. By this construction, it will be evident that part of the load which the spring transmits to the axle is carried by the link, 20, directly from the longitudinal members, 12 and 13, on which the body, A, is supported, while the remainder of the load comes to the spring by way of the bracket, 4, and is transmitted through plates, 11 and 14, and the rivets, 22, by which they are secured to the upper and lower channels of the frame. The stress imposed upon the plates, 11 and 14, and the rivets is thus much less than it would be if the inner end of the spring were shackled to the upper frame members, 5 and 15, since in that event the entire load must come to the springs through the plates, 11 and 14. The present construction, therefor, admits of lighter plates and fewer rivets and greatly reduces the liability of distortion of the frame from overloading or severe shock. Since the draw bars 9 are attached at 10 to the cross members 8 which are a part of the upper frame sections at the ends of the trailer including the upper longitudinal members 5, the draw bar pull is transmitted to the lower rails 12 and 13 of the drop section of the frame wholly by the plates 11 and 14, thus imposing an initial horizontal shear on the rivets by which these plates are secured to the frame members. The inertia of the load itself which is carried on the lower rails 12 and 13 thus acts through these rivets whenever the vehicle is started or stopped. But the support of the load on the hangers 20 relieves the rivets of much additional strain which they must otherwise carry.

As shown in Figure 2 the hopper body, A, is usually provided with curved channels, A¹, to serve as rockers and they are supported upon transverse rails whose position is indicated at 23 in Figure 1 and which are shown in full lines in Figure 3 as being each composed of a pair of channels, 23, set back to back. Figure 5 shows the method of securing the rails, 23, to the supporting frame members, 12 and 13. A cast spacer box, 24, is secured between the channels, 12 and 13, by bolts, 25, and a cap member in the form of a downwardly facing channel, 26, is lodged upon the members, 12 and 13 and centered in position thereon by heavy bolts, 27, extending up through the spacers, 24; the transverse rails, 23, are riveted to the cap rails, 26, as seen in Figure 5 and for further rigidity of construction a plate, 28, may be riveted to the under flanges of the members, 12 and 13, thus serving to receive the head of the bolt, 27.

As shown in Figure 4 the hanger, 20, is bifurcated at both ends receiving the spring end between its upper ends and the bracket, 21, between its lower end portions. A T shaped web, 29, serves to tie together the flange portions of the hanger which carry the load.

I claim:—

1. In a vehicle frame, an axle, a drop frame comprising a side member formed of two channels spaced apart and facing each other with a filler shaped to fit into them for spacing them apart, said channels comprising a lower rail of the frame, an upper rail of said frame similarly formed of two channel members with a fitted filler spacing them apart facing each other, a vehicle spring supported on the axle with one end attached to the upper rail by a fixed pivot, a pair of plates secured respectively to opposite sides of the two rails extending vertically for connecting them, the filler for the lower rail having a direct link connection with the other end of the spring.

2. In a vehicle frame an axle, a drop-frame comprising a side member formed of two rails spaced apart with a filler secured between them, said rails comprising a lower portion of the frame; an upper portion of said frame also formed of two rails with a filler spacing them apart, a vehicle spring supported on the axle with one end attached to the upper frame portion by a fixed pivot, a pair of plates each secured to one of the upper rails and one of the lower rails and extending vertically for connecting them, the other end of the spring extending between the two plates with a hanger pivoted thereto at its upper end; and a lug on the filler of the lower rails pivotally attached to the lower end of said hanger.

3. In a trailer vehicle, a drop frame including an upper frame section with longitudinal rails at the end of the vehicle, and a drawbar attached to said section, a lower frame section on which the load is carried, also including longitudinal rails together with separate plate members rigidly connecting the upper and lower rails; an axle disposed under the upper frame section with a spring perched between the ends, means by which one end of each spring is attached to the upper frame section and means independent of said connecting plates suspending the longitudinal rails of the lower frame section from the opposite ends of the springs.

4. In a trailer vehicle, a drop frame including an upper longitudinal rail in the end portion of the frame with a draw-bar attached thereto, a lower longitudinal rail on which the load is carried and a downwardly extending member connecting the upper rail and the lower rail and rigidly secured to both of them; an axle disposed under the upper rail and a spring perched between its ends on the axle, a fixed pivot by which one end of the spring is anchored to the upper rail and a swinging hanger pivotally connected at its upper end to the other end of said spring and pivotally connected at its lower end to the lower rail of the frame, whereby the load is transmitted from the lower rail of the frame to said spring end to the exclusion of the downwardly extending member.

CHARLES G. CLEMENT.